(12) United States Patent
Clark et al.

(10) Patent No.: US 8,020,813 B1
(45) Date of Patent: Sep. 20, 2011

(54) APPARATUS FOR ROUTING CABLE ACROSS HOUSING

(75) Inventors: Joseph R. Clark, Naperville, IL (US); Gregory Lucius Herrmann, Decatur, GA (US); David Wayne Kirkpatrick, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 12/508,809

(22) Filed: Jul. 24, 2009

(51) Int. Cl.
*F16L 3/08* (2006.01)

(52) U.S. Cl. ...................... 248/74.2; 385/135

(58) Field of Classification Search .................. 248/49, 248/74.1, 74.2; 385/135; 439/528
See application file for complete search history.

(56) References Cited

U.S. PATENT DOCUMENTS

| | | | |
|---|---|---|---|
| 4,428,645 A * | 1/1984 | Korbelak et al. .............. 385/135 |
| 5,390,075 A * | 2/1995 | English et al. ........... 361/679.28 |
| 5,411,443 A * | 5/1995 | Meier et al. ................... 474/145 |
| 5,442,725 A * | 8/1995 | Peng ............................ 385/135 |
| 5,530,787 A * | 6/1996 | Arnett ........................... 385/137 |
| 5,668,911 A * | 9/1997 | Debortoli ...................... 385/135 |
| 5,715,348 A * | 2/1998 | Falkenberg et al. .......... 385/135 |
| 5,987,207 A * | 11/1999 | Hoke .............................. 385/135 |
| 6,511,009 B1 | 1/2003 | Harrison et al. |
| 6,665,484 B2 * | 12/2003 | Douglas et al. ............... 385/136 |
| 6,708,480 B1 * | 3/2004 | Wehler ........................... 59/78.1 |
| 6,738,554 B2 * | 5/2004 | Daoud et al. .................. 385/135 |
| 6,760,530 B1 | 7/2004 | Mandry |
| 7,346,253 B2 * | 3/2008 | Bloodworth et al. ......... 385/135 |
| 7,359,609 B2 * | 4/2008 | Mahoney et al. ............. 385/135 |
| 7,711,235 B2 | 5/2010 | Riggsby et al. |
| 7,822,310 B2 * | 10/2010 | Castonguay et al. ......... 385/135 |
| 2006/0280419 A1 * | 12/2006 | Mahoney et al. ............. 385/135 |
| 2007/0206907 A1 * | 9/2007 | Mizoguchi et al. ............. 385/89 |
| 2008/0205844 A1 * | 8/2008 | Castonguay et al. ......... 385/135 |

\* cited by examiner

*Primary Examiner* — Terrell McKinnon
*Assistant Examiner* — Daniel J Breslin
(74) *Attorney, Agent, or Firm* — Edell, Shapiro & Finnan, LLC (57) ABSTRACT

A system for routing fiber optic cable includes a hinged housing, a cable storage device connected to a first portion of the housing, and a cable guide. The cable guide includes a flexible strap having a first end connected to the cable storage device and an opposite second end coupled to a second portion of the housing. The cable guide includes a first sidewall extending upwardly from a first side of the flexible strap and a second sidewall extending upwardly from an opposite second side of the flexible strap. The cable guide defines a channel configured for receiving a cable.

20 Claims, 13 Drawing Sheets

APPARATUS FOR ROUTING CABLE ACROSS HOUSING

TECHNICAL FIELD

The present disclosure relates generally to an apparatus for routing fiber optic cable from one portion of a hinged housing to another portion of the hinged housing.

BACKGROUND

Network installations continue to employ increasing amounts of fiber optic cable. Fiber optic cable typically includes at least one glass core for optical, high bandwidth transmission of information. Typically, fiber optic cable requires a minimum bending radius to avoid damaging the glass core and to avoid signal loss in the transmission of information through the cable. Twists or kinks in the cable can cause microcracks, which over time can propagate in the cable and decrease the reliability and longevity of the system and result in costly field repairs and replacements.

In order to maximize fiber performance and prevent costly network outages, it is desirable that each fiber cable be protected against excessive bending, inadvertent disconnects, and accidental damage. Further, it is desirable to store excess lengths of fibers so that they are organized and protected from damage. In hinged housings, such as optical housings, it is sometimes difficult to route fiber from one side of the housing to the other side of the housing across the hinge of the housing. The fiber is prone to being kinked, twisted, pinched or otherwise damaged, particularly when the housing is opened and closed.

DESCRIPTION OF EXAMPLE EMBODIMENTS

Overview

A system for routing cable includes a hinged housing, a cable storage device connected to a first portion of the housing, and a cable guide. The cable guide includes a flexible strap having a first end portion connected to the cable storage device and an opposite second end portion coupled to a second portion of the housing. The cable guide includes a first sidewall extending upwardly from a first side edge of the flexible strap and a second sidewall extending upwardly from an opposite second side edge of the flexible strap. The cable guide defines a channel configured to receive a cable.

Figure 1:
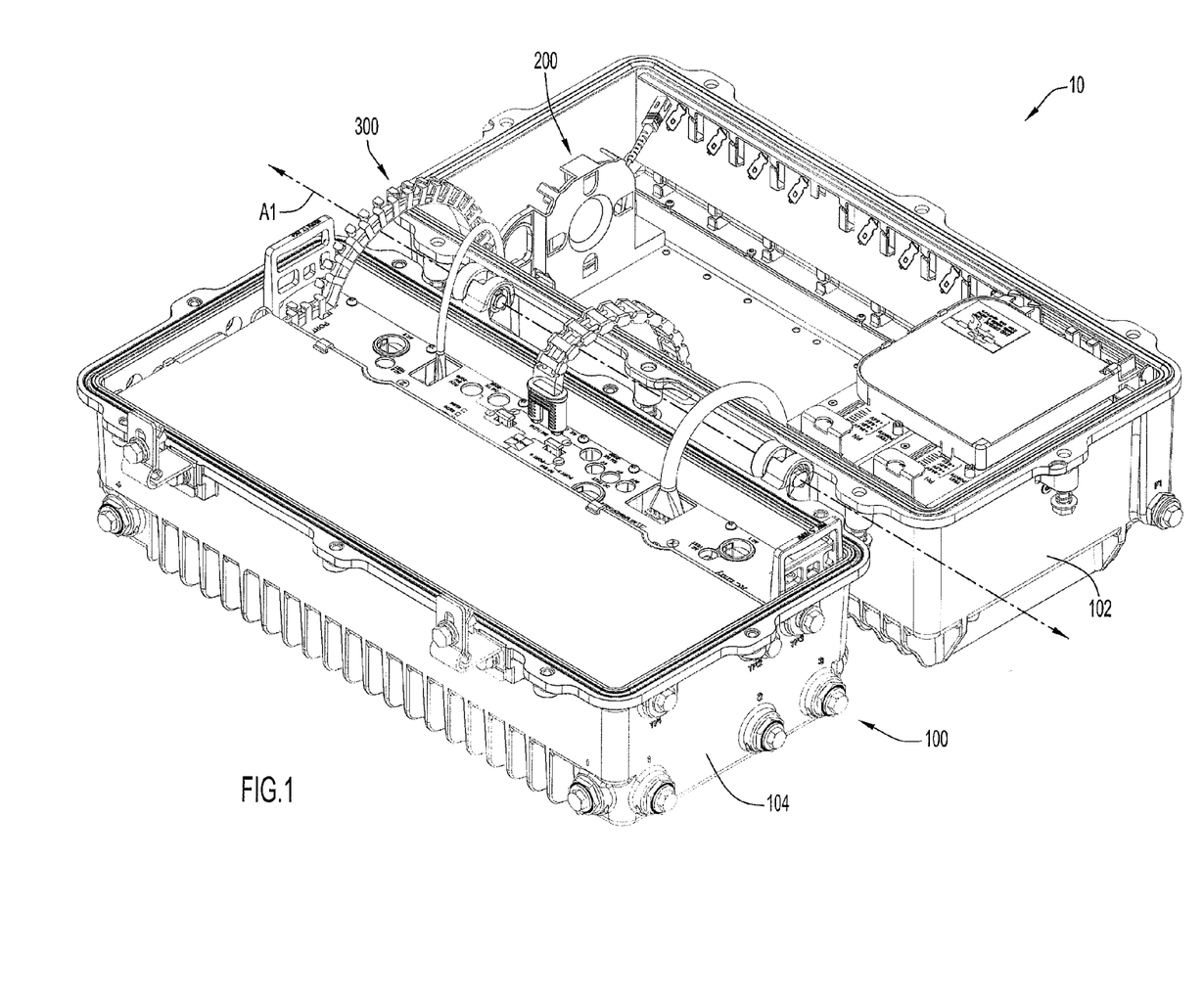
FIG. 1 illustrates a perspective view of an example embodiment of a system for routing cable from one portion of a hinged housing to another portion of the hinged housing.
Figure 2:
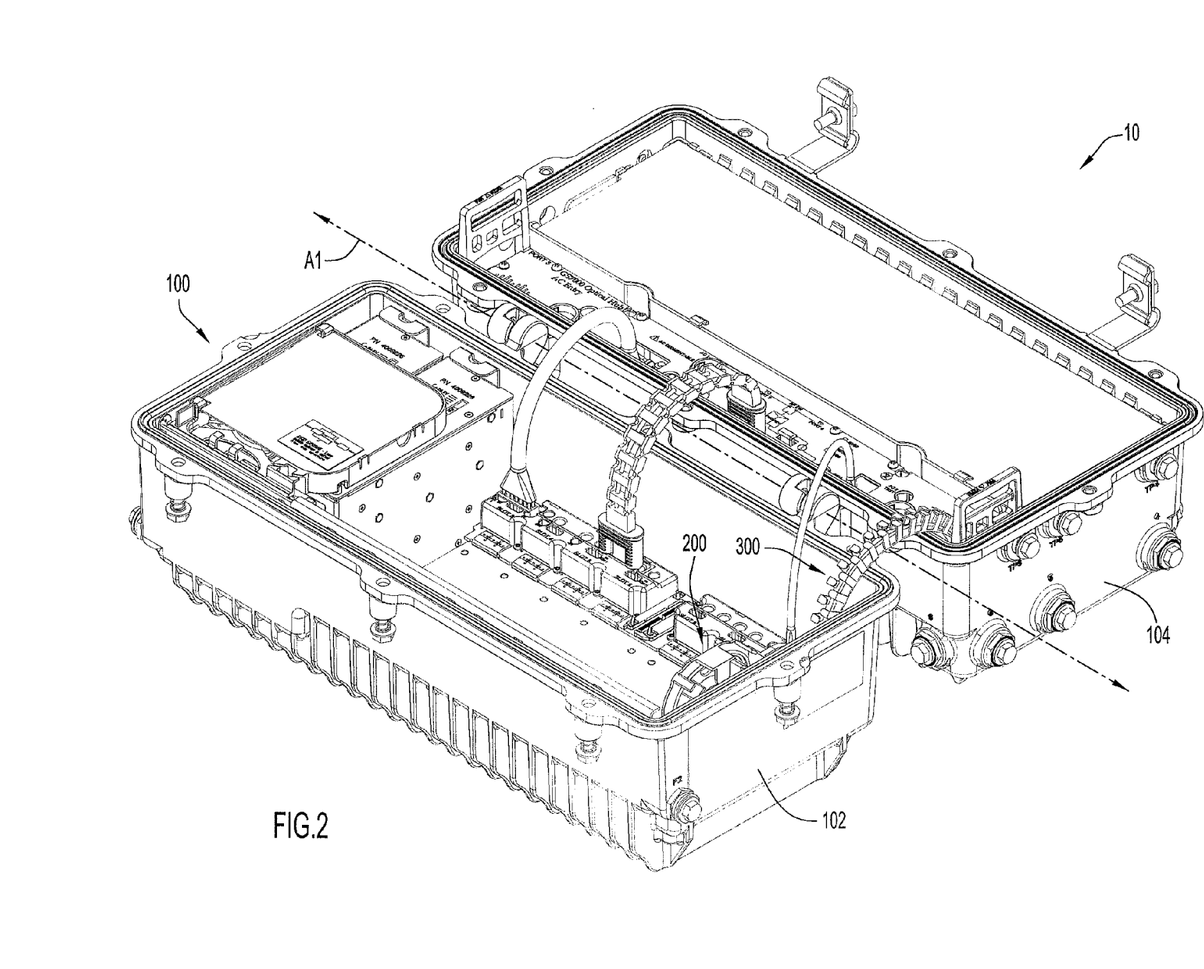
FIG. 2 illustrates another perspective view of the system of FIG. 1.

Referring to FIGS. 1 and 2, an example embodiment of a system 10 for routing cable includes a housing 100, a cable storage device 200, and a cable guide 300. The housing 100 includes a first portion 102 hingedly connected to a second portion 104, which are pivotally moveable relative to each other about an axis A1 between an open position and a closed position. The cable storage device 200 may be connected to an interiorly disposed surface of the first portion 102 of the housing 100.

Figure 3:
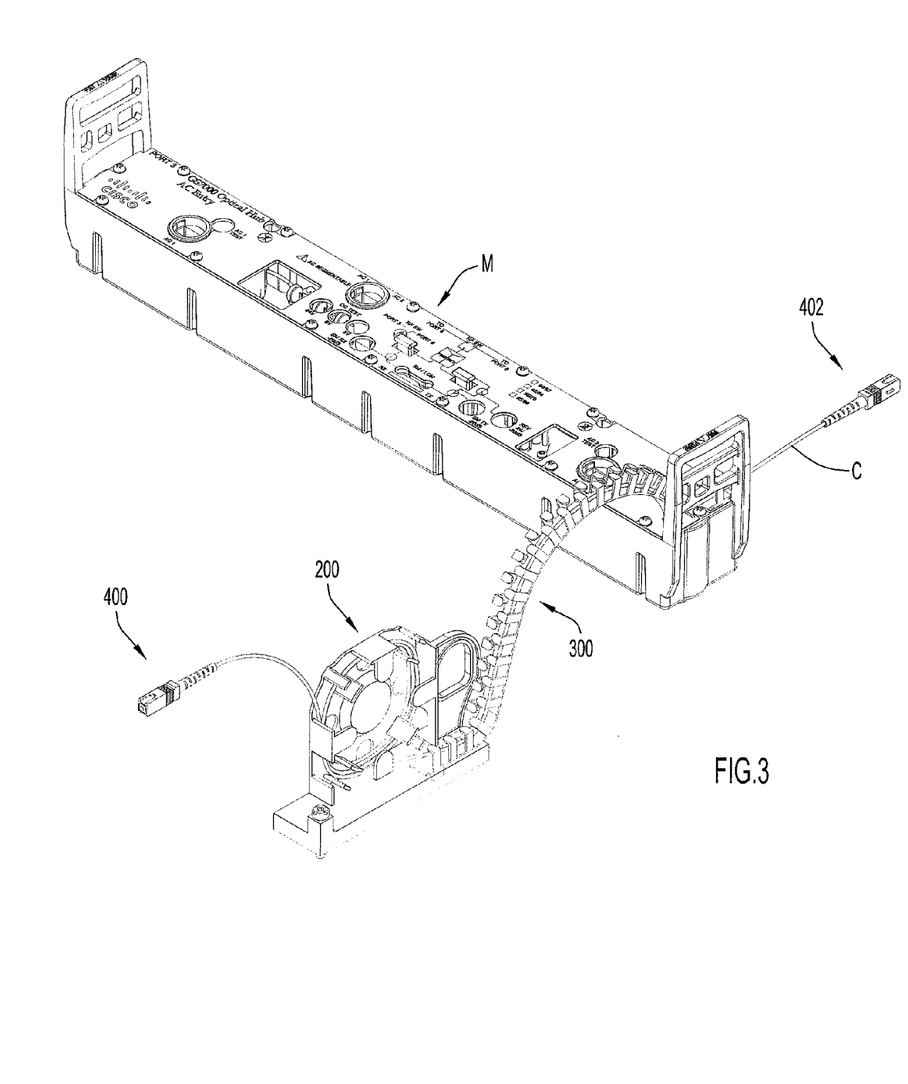
FIG. 3 illustrates a perspective view of a cable storage device, a cable guide connected to a component, and cable retained therein of the system of FIG. 1.
Figure 4:
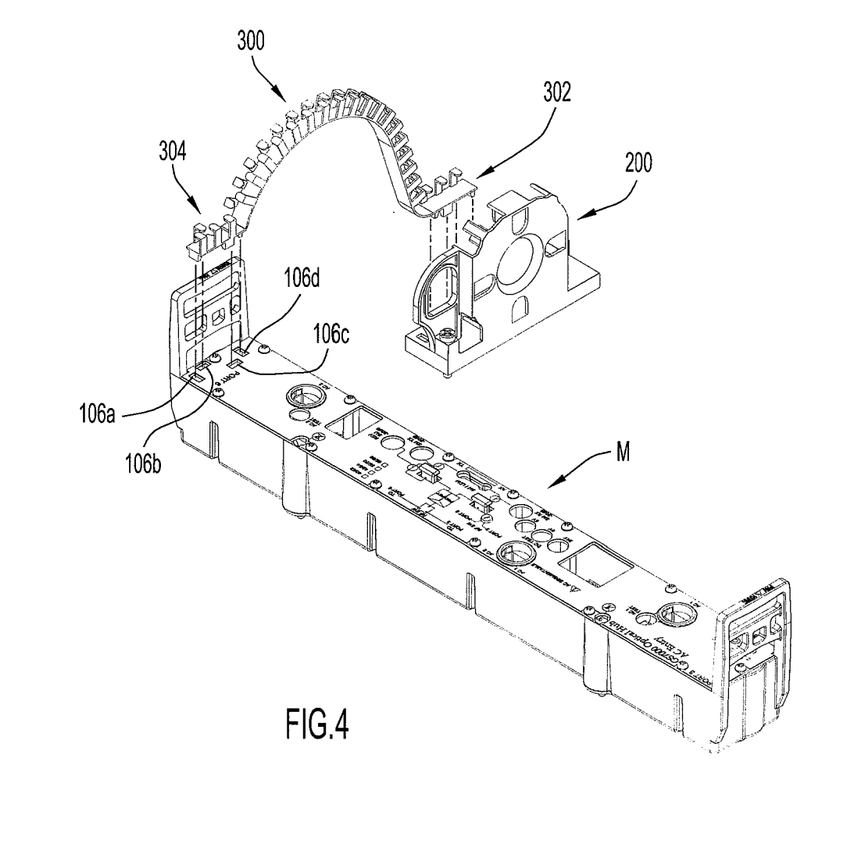
FIG. 4 illustrates a perspective assembly view of the cable storage device, the cable guide and component of FIG. 3.

Referring to FIGS. 3 and 4, the cable guide 300 includes a first end portion 302 securable to the first portion 102 of the housing 100, and an opposite second end portion 304 securable to the second portion 104 of the housing. Preferably, the first end portion 302 is secured to the cable storage device 200, which is in turn secured to the first portion 102 of the housing 100 (as shown in FIGS. 1 and 2). Alternatively, the first end portion 302 may be connected directly to the interiorly disposed surface of the first portion 102 or to some other component secured within the first portion 102 of the housing 100.

The second end portion 304 of the cable guide 300 may be connected directly to an interiorly disposed surface of the second portion 104 of the housing 100, or alternatively to a component secured within the second portion 104. For example, the second end portion 304 may be connected to an AC entry module M disposed within and connected to the second portion 104 of the housing 100.

Figure 5:
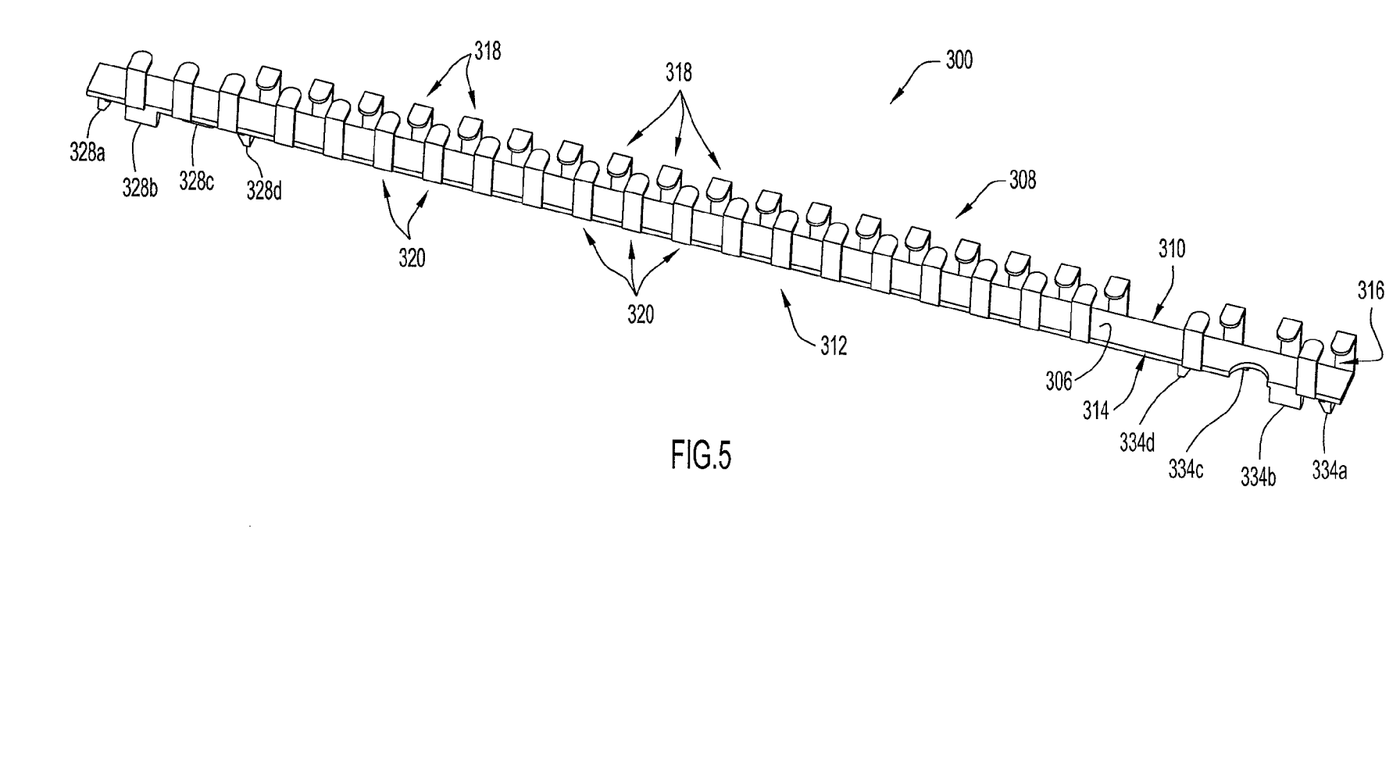
FIG. 5 illustrates a perspective view of the cable guide.

Referring to FIG. 5, the cable guide 300 includes a flexible strap 306 including a first sidewall 308 extending upwardly from a first side edge 310 thereof, and a second sidewall 312 extending upwardly from a second side edge 314 thereof. The flexible strap 306 and first and second sidewalls 308, 312 define a channel 316 configured for receiving a cable C (as shown in FIG. 3). The first sidewall 308 preferably includes a first plurality of spaced ribs 318, and the second sidewall 312 includes a second plurality of spaced ribs 320. Ribs 318, 320 may be identically configured, or vary in configuration. Preferably, the first plurality of ribs 318 is staggered from the second plurality of ribs 320 in arrangement along the opposing first and second side edges 310, 314.

The specific configuration of ribs 318, 320 may vary depending on the specific length and width of the flexible strap 306, the thickness and flexibility of the material forming the cable guide 300, the thickness and properties of the cable C to be retained with the cable guide 300, and the desired minimum radius of curvature of the cable guide 300.

Figure 6:
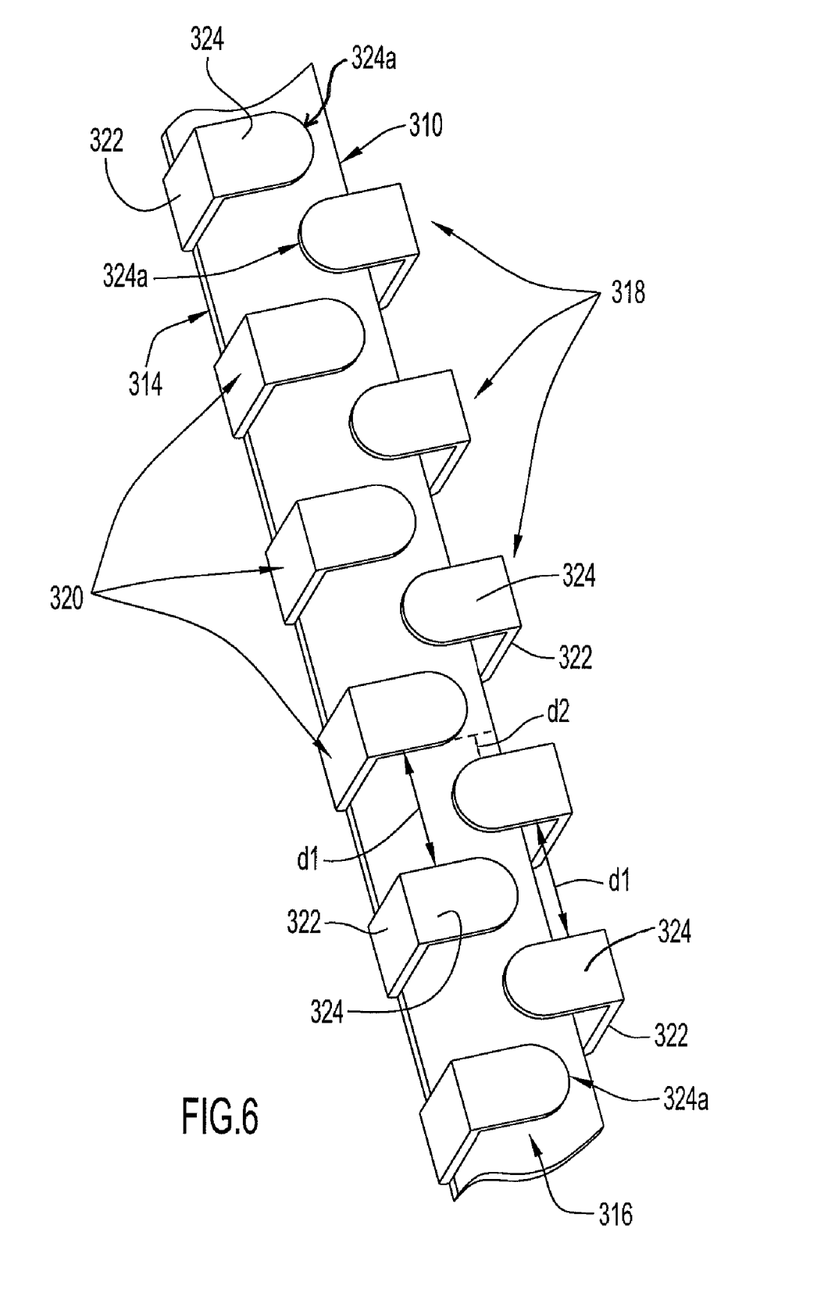
FIG. 6 illustrates an exploded perspective view of a portion of the cable guide of FIG. 5.

Referring to FIG. 6, each of ribs 318, 320 may have an inverted 'L' shaped configuration, including a first leg 322 connected to and extending upwardly from a corresponding one of the first or second side edges 310, 314, and a second leg 324 extending outwardly from a distal end of the first leg 322 thereof and toward the channel 316. The first leg 322 may be substantially perpendicular to the second leg 324, or may be angularly disposed. Alternatively, each rib may have an arcuate configuration, curving inwardly toward the channel 316.

Figure 7:
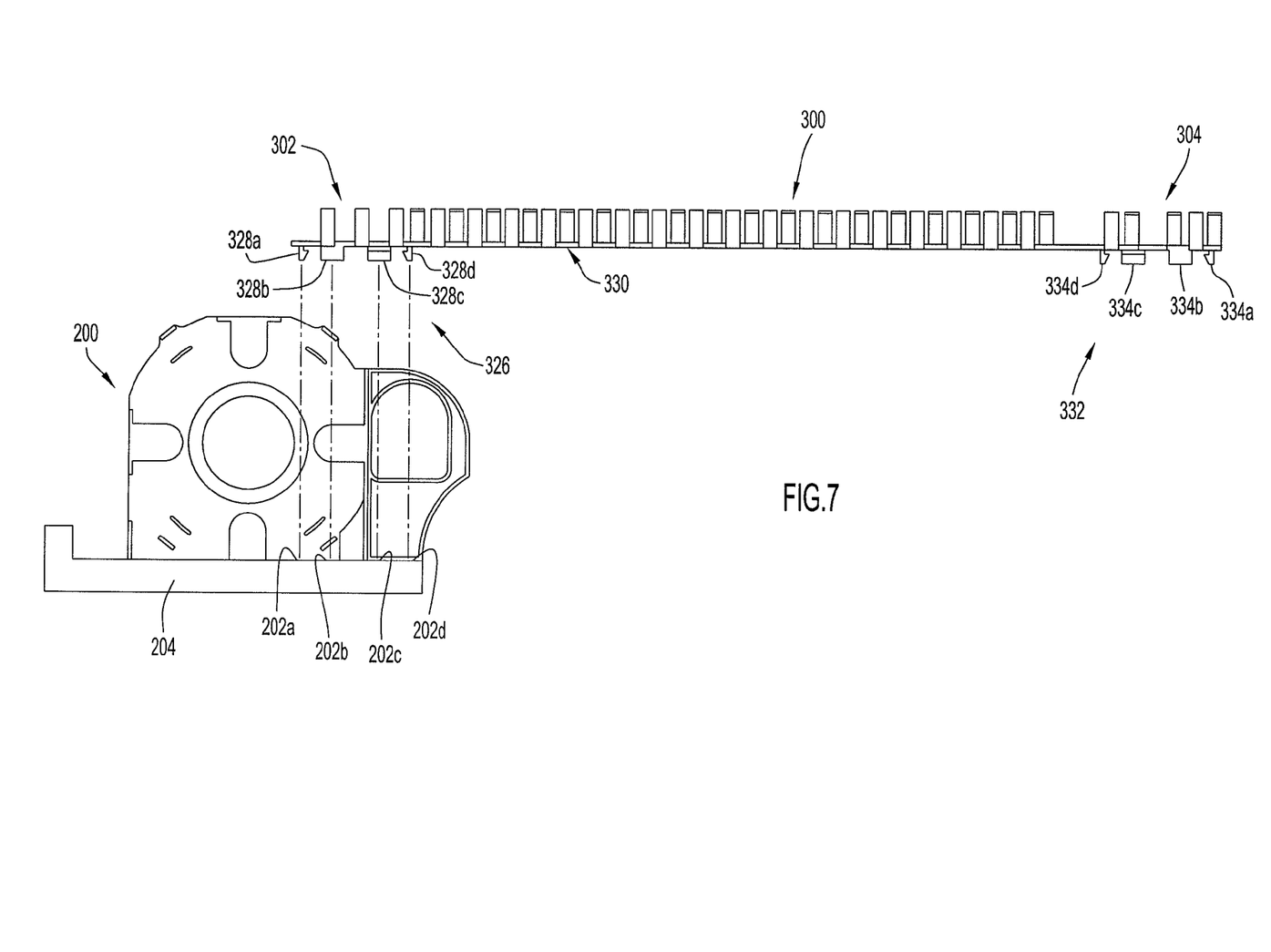
FIG. 7 illustrates an elevational assembly view of the cable storage device and cable guide.

Referring to FIGS. 5 and 7, the cable guide 300 preferably includes a first connection mechanism 326 disposed on the first end portion 302 thereof, which may be configured for securing the first end portion 302 to the cable storage device 200. The first connection mechanism 326 may include one or more latches 328a, 328b, 328c, 328d extending outwardly from an underside 330 of the flexible strap 306 proximate the first end portion 302. The latches 328a-328d are securable within correspondingly configured and arranged openings 202a, 202b, 202c, 202d provided in a base portion 204 of the cable storage device 200, as best shown in FIG. 8.

A second connection mechanism 332 is preferably disposed on the second end portion 304 of the cable guide 300, which may likewise include one or more latches 334a, 334b, 334c, 334d. The latches 334a-334d are similarly securable within correspondingly configured and arranged openings 106a, 106b, 106c, 106d provided in the AC entry module M, as best shown in FIG. 4, or in some other component disposed within the second portion 104 of the housing 100.

The first and second pluralities of ribs 318, 320, the flexible strap 306, and the first and second connection mechanisms 326, 332 are preferably integrally formed. Alternatively, one or more of these components may be separately formed and attached together via fasteners, adhesive, heat weld, etc. The cable guide 300 is preferably formed from a material that is capable of maintaining its structural integrity in an environment having wide temperature fluctuations (e.g. temperature range fluctuations of between −40° C. to 105° C.). Similarly, the cable storage device 200 is also preferably formed from a material capable of maintaining its structural integrity in such thermal conditions. In an example embodiment, the cable guide 300 and/or cable storage device 200 may be formed from high density polyethylene.

Figure 8:
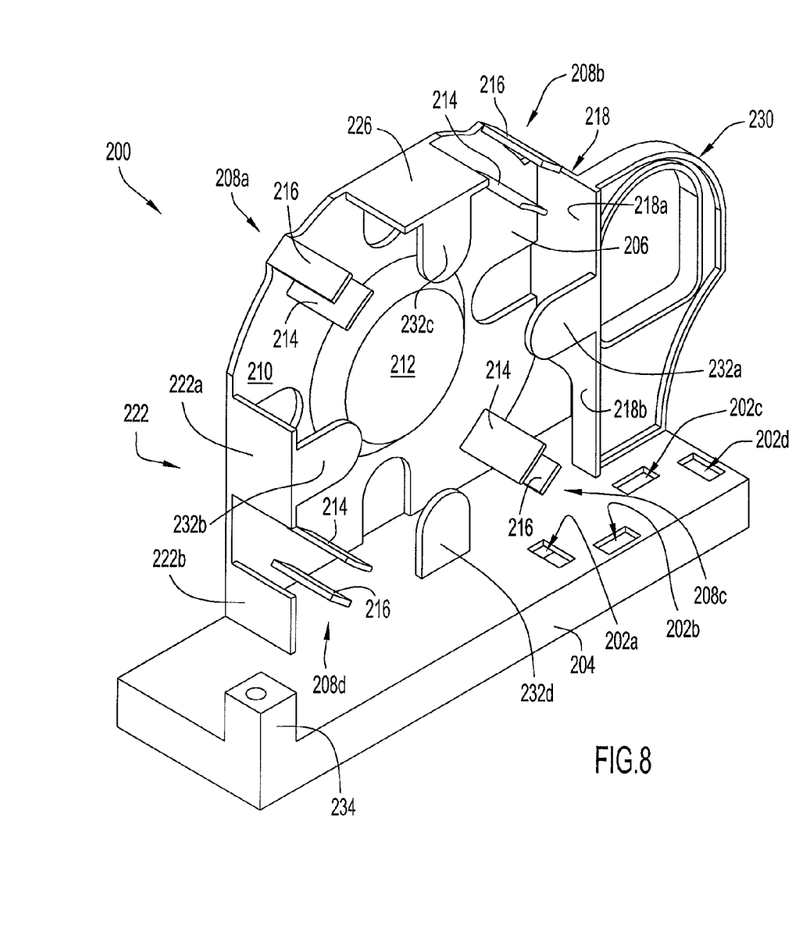
FIG. 8 illustrates a front perspective view of the cable storage device.
Figure 9:
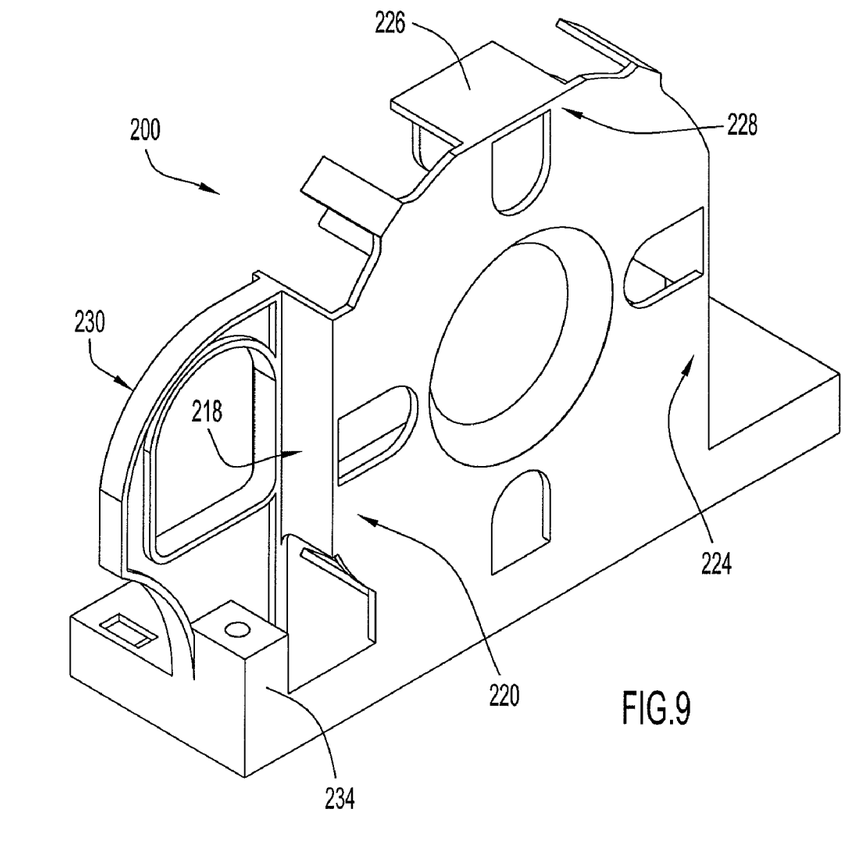
FIG. 9 illustrates a rear perspective view of the cable storage device.

Referring to FIGS. 8 and 9, the cable storage device 200 may include a plate portion 206 extending outwardly from the base portion 204. A plurality of guide assemblies 208a, 208b, 208c, 208d extend outwardly from a first major surface 210 of the plate portion 206. The guide assemblies 208a-208d may be radially spaced about a central portion 212 of the plate portion 206. Each guide assembly 208a-208d includes spaced first and second guide walls 214, 216 that are radially aligned relative to the central portion 212. Preferably, the first and second guide walls 214, 216 are substantially perpendicular to the first major surface 210. A portion of cable C may be coiled around the central portion 212 and retained between the spaced first and second guide walls 214, 216 of the guide assemblies 208a-208d, as best shown in FIG. 3. The radius of the resulting portion of coiled cable C retained on the cable storage device 200 is limited by the guide assemblies 208a-208d, thereby limiting the radius of curvature of the cable C.

The cable storage device 200 may also include a first wall 218 extending outwardly from a first edge portion 220 of the plate portion 206, a second wall 222 extending outwardly from an opposite second edge portion 224, and a third wall 226 extending outwardly from a upper edge portion 228.

The first wall 218 may include an upper portion 218a connected to the first edge portion 220 and a lower portion 218b extending downwardly from the upper portion 218a and connected to the base portion 204. Thus, the first wall 218 preferably extends between and interconnects the plate portion 206 and the base portion 204, thereby enhancing the structural integrity of the cable storage device 200. A handle 230 may extend outwardly from the first wall 218. Preferably, the handle 230 extends between and interconnects the first wall 218 and the base portion 204, providing additional structural support to the plate portion 206.

The second wall 222 may include a first portion 222a and a second portion 222b spaced therefrom. Preferably, first and second portions 222a, 222b do not extend along the entire length of second edge portion 224 of the plate portion 206. Similarly, the third wall 226 preferably does not extend along the entire length of upper edge portion 228. In this way, gaps are provided in the second wall 222 and the third wall 226 through which the cable C may extend. One or more gaps may also be provided in the first wall 218.

First, second and third walls 218, 222, 226, together with the guide assemblies 208a-208d, restrict a coiled portion of cable C retained within the cable storage device 200 from undesirably uncoiling. In order to prevent a coiled portion of cable C from sliding outwardly from the plate portion 206 and off the distal ends of the guide assemblies 208a-208d, a plurality of retaining plates 232a, 232b, 232c, 232d may be provided.

The retaining plates 232a-232d are preferably radially spaced about the central portion 212. Retaining plate 232a may be connected to and extend inwardly toward the central portion 212 from the first wall 218. Retaining plate 232b may be connected to and extend inwardly toward the central portion 212 from the second wall 222. Retaining plate 232c may be connected to and extend inwardly toward the central portion 212 from third wall 226. Retaining plate 232d may be connected to and extend upwardly from the base portion 204 toward the central portion 212.

Figure 10:
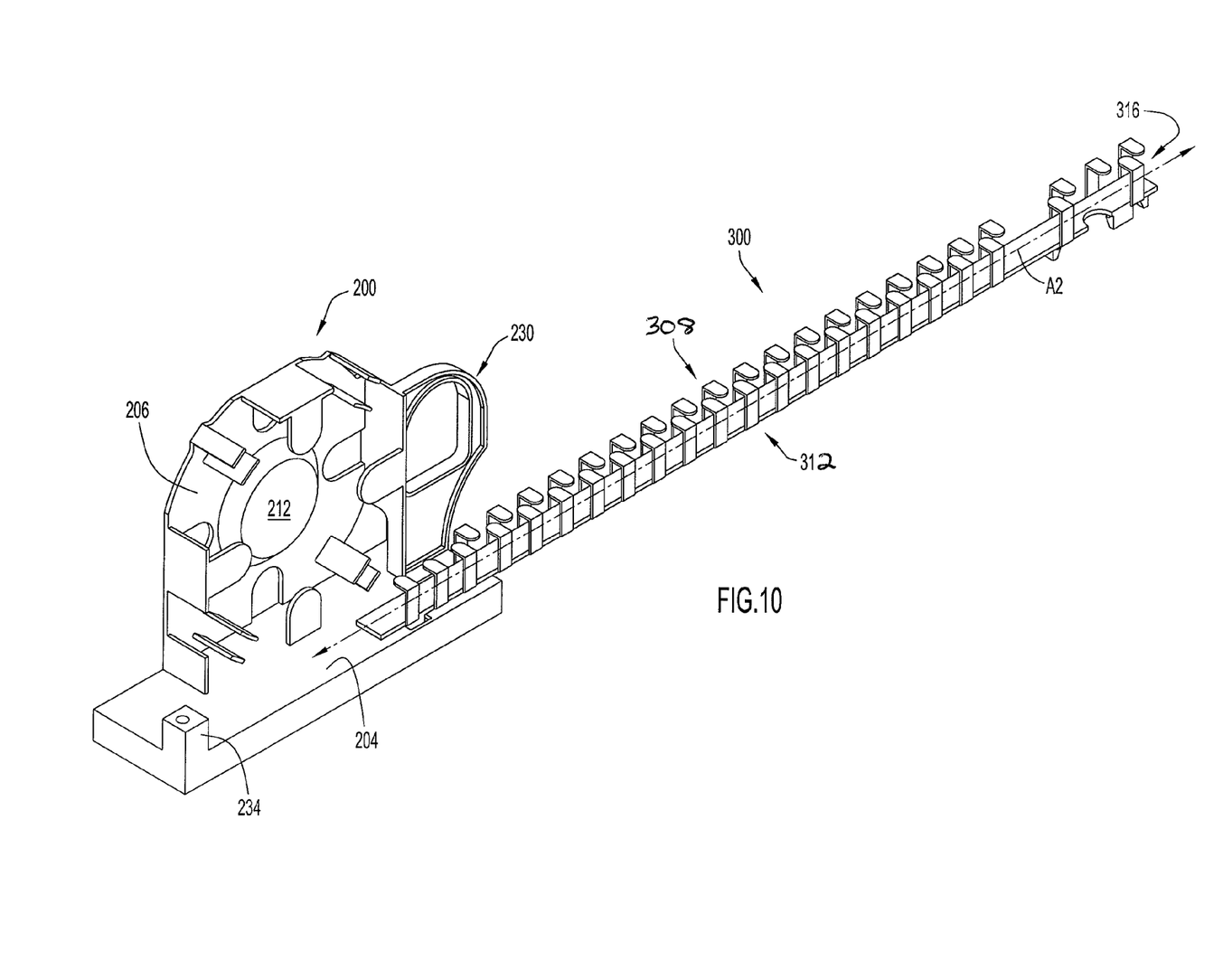
FIG. 10 illustrates a perspective view of the cable guide connected to the cable storage device.

Openings 202a, 202b, 202c, 202d in the base portion 204 are preferably adjacent and aligned with the plate portion 206 so that a longitudinal axis A2 of the channel 316 of the cable guide 300 lies on a plane substantially parallel to the plane on which the plate portion 206 lies when the cable guide 300 is secured to the cable storage device 200, as shown in FIG. 10.

Referring again to FIGS. 8 and 9, the base portion 204 may include one or more bored engagement posts 234 configured for receiving corresponding fasteners (not shown) that extend therethrough and into corresponding openings in the first portion 102 of the housing 100, thereby securing the cable storage device 200 to the housing 100.

Figure 11:
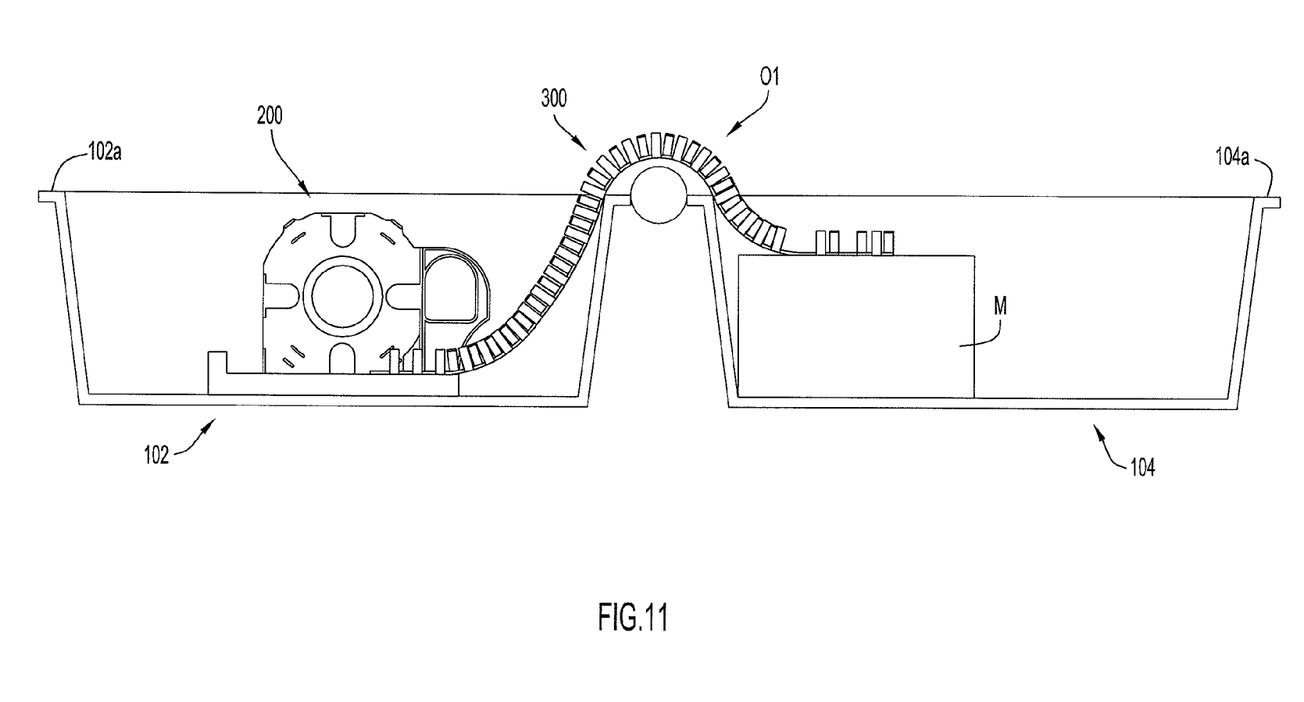
FIG. 11 illustrates a sectional side view of the system of FIG. 1, showing the hinged housing in an open position.
Figure 12:
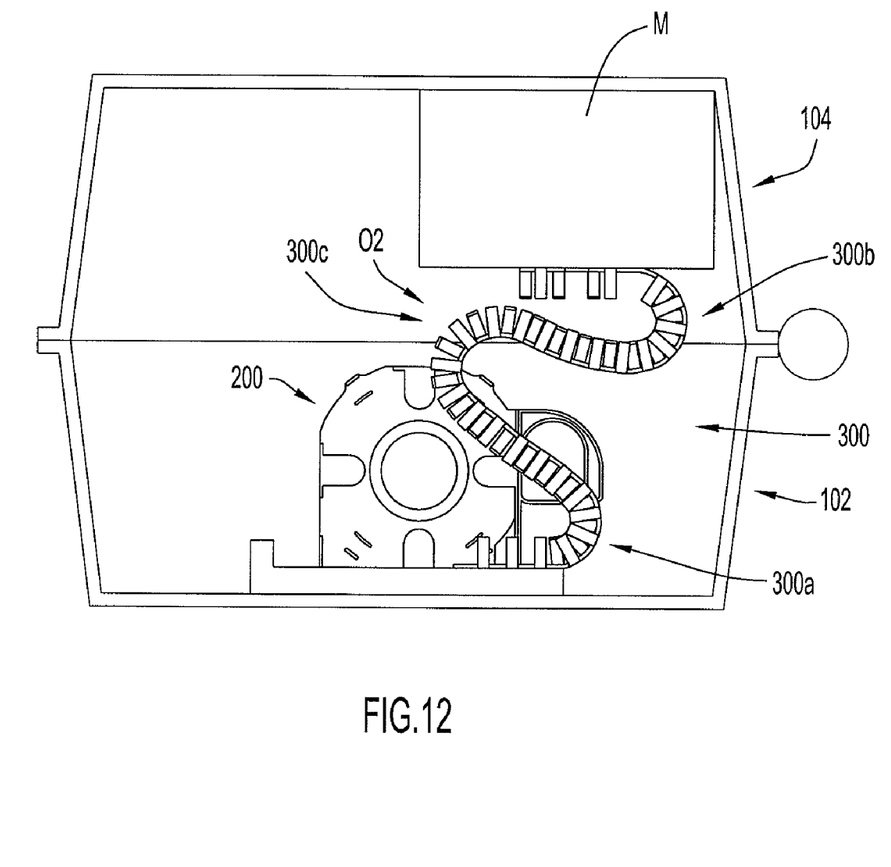
FIG. 12 illustrates a sectional side view of the system of FIG. 1, showing the hinged housing in a closed position.

When secured between the first and second portions 102, 104 of the housing 100, the cable guide 300 is reconfigurable between a first orientation O1, shown in FIG. 11, when the first and second portions 102, 104 are in an open position, and a second orientation O2, shown in FIG. 12, when the first and second portions 102, 104 are in a closed position. The cable guide 300 includes a first radius of curvature in the first orientation O1, and a second radius of curvature less than the first radius of curvature in the second orientation O2.

As the first and second portions 102, 104 of the housing 100 are pivoted from the open position to the closed position, the cable guide 300 preferably resiliently flexes or folds in upon itself in an accordion-type manner. The resulting cable guide 300 when in the second orientation O2 may have an 'S-shaped' or 'W-shaped' configuration.

The resulting radius of curvature of any curved portion of the cable guide 300, when in the second orientation O2, is equal to or greater than a minimum bend radius of the cable C to be routed therethrough, wherein the minimum bend radius is the radius below which the cable C should not be bent to avoid damage to the cable. The minimum bend radius is particularly relevant when handling optical fiber or fiber-optic cable. Bending of optical fiber beyond a minimum bend radius may result in signal loss given the curvature may be too small for the signal to follow the fiber. The minimum bend radius varies with different cable types and designs. Typically, the minimum radius to which the cable may safely be bent is specified by the manufacturer.

The radius of curvature of the cable guide 300 may in part be controlled by the spacing and configuration of the ribs 318, 320, as well as the flexibility of the strap 306. Referring to FIGS. 6, 11 and 12, as the cable guide 300 is reconfigured or folded from its first orientation O1 to its second orientation O2, the radius of curvature of portions 300a, 300b of the cable guide 300 decreases. The spacing d1 between adjacent ribs 318 and between adjacent ribs 320 decreases as the cable guide 300 is curved inwardly at portions 300a, 300b as the first and second portions 102, 104 are moved from the open position to the closed position. In addition, the spacing d2 between each rib 318 and opposing rib 320 decreases at portions 300a, 300b as the first and second portions 102, 104 are moved into the closed position.

As portions 300a, 300b of the cable guide 300 are curved or flexed inwardly, the distal ends 324a of the second legs 324 of opposing rib 318 and 320 contact each other, given the distal ends 324a extend beyond a central axis of the channel 316. As the distal ends 324a contact each other, the spacing d2 between opposing ribs 318, 320 is eliminated. With continued inward bending of the cable guide 300, the ribs 318, 320 are tensionably flexed outwardly away from the central axis of the channel 316, given the distal ends 324a of opposing ribs 318, 320 push against each other. Due in part to the rounded configuration of the distal ends 324a, the ribs 318, 320 slide against each other, and the ribs 318, 320 are pushed outwardly and away from the channel 316. The curvature of the cable guide 300 in portions 300a, 300b may increase until adjacent ribs 318 along the first side edge 310 contact each other, and adjacent ribs 320 along the second side edge 314 contact each other. Thus, the spacing d1 between adjacent ribs 318 and 320 in portions 300a, 300b of the cable guide 300 may be substantially eliminated.

Once in contact, adjacent ribs 318 and 320 act as stops, restraining further curvature of the cable guide 300, thereby controlling the minimum bend radius. At this point, the ribs 318, 320 are tensioned outwardly slightly from the channel 316 (due to the forces exerted by opposing distal ends 324a). The ribs 318, 320 are however biased inwardly toward their initial position wherein their distal ends 324a extend beyond the central axis of the channel 316 (i.e. prior to being tensionably deformed outwardly). This force tends to bias the ribs 318, 320 inwardly until the distal ends 324a again extend beyond the central axis of the channel 316 and thus force adjacent ribs 318 and 320 apart. Thus, a predetermined maximum curvature of the cable guide 300 in any particular portion is maintained and tends not to be exceeded. It should be understood that the specific spacing and flexibility of the ribs 318, 320 may vary depending on the desired minimum bend radius of the cable guide 300.

The curvature of the cable guide 300 may also be partially controlled by the flexibility of the strap 306. Depending on its specific configuration as well as the material from which it is formed, the maximum curvature of the strap 306 may be controlled. Preferably, the strap 306 is biased toward a substantially planar configuration, such as shown in FIG. 5.

Referring again to FIGS. 11 and 12, the radius of curvature of a central portion 300c of the cable guide 300 (of the outwardly disposed portion of the curve from which the ribs 318, 320 extend) increases as the cable guide 300 is reconfigured or folded from its first orientation O1 to its second orientation O2. The spacing d1 between adjacent ribs 318, 320 at central portion 300c therefore increases as the cable guide 300 is reconfigured between its first and second orientations O1, O2 as the first and second portions 102, 104 are moved into the closed position. Thus, the ribs 318, 320 do not act as stops in the outwardly curved central portion 300c of the cable guide during reconfiguration.

The flexible strap 306 is preferably sufficiently resilient such that the cable guide 300 may be tensionably deformed between a planar configuration (as shown in FIG. 5) and the curved first or second orientations O1, O2. However, the properties of the flexible strap 306 preferably restrain the cable guide 300 from exceeding a predetermined maximum curvature of any portion of the cable guide 300, thereby controlling the minimum bend radius.

Figure 13:
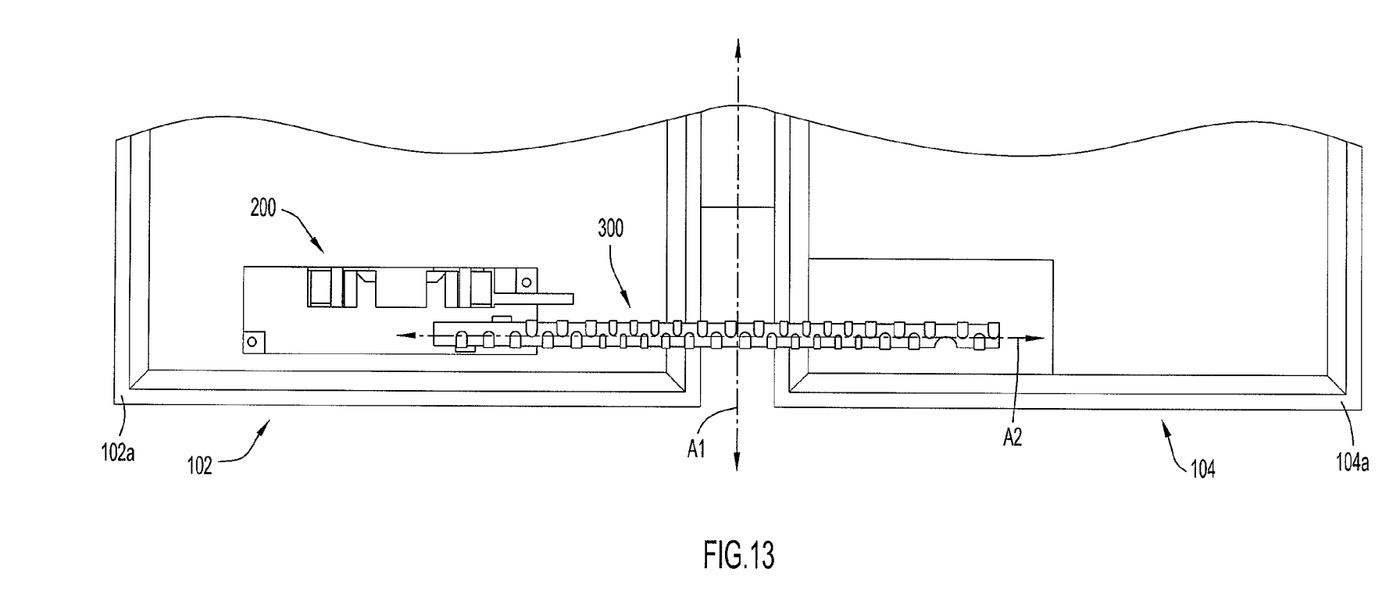
FIG. 13 illustrates a fragmentary top view of the system of FIG. 1, showing the hinged housing in the open position.

Referring to FIG. 13, the cable guide 300 preferably extends outwardly from the cable storage device 200 in a direction substantially transverse to the axis of rotation A1 about which the first and second portions 102, 104 of the housing 100 pivot. Thus, the plane on which the longitudinal axis A2 of the channel 316 of the cable guide 300 lies is preferably substantially traverse to the plane on which the axis of rotation A1 of the first and second portions 102, 104 lie.

The internal channel 316 of the cable guide 300 ensures that the cable(s) C routed therethrough are organized and protected throughout the range of operating motion of the first and second portions 102, 104 of the housing 100 as it is opened and closed. In addition, the first and second connection mechanisms 326, 332 preferably retain the first and second end portions 302, 304 of the cable guide 300 against the corresponding first and second portions 102, 104 of the housing 100 so that lateral movement of the cable guide 300 (i.e. movement traverse to the plane on which the longitudinal axis A2 lies) is restricted. In this way, the cable guide 300 and any cable C retained therein is maintained in a spaced position from the peripheral edges 102a, 104a of the first and second portions 102, 104, respectively. Therefore, the possibility of undesirably pinching, crushing, twisting or kinking the cable C, even as the housing 100 is opened and closed, is substantially eliminated.

In operation, the first end portion 302 of the cable guide 300 may be secured to the cable storage device 200. The cable storage device 200 is secured within the first portion 102 of the housing 100. The second end portion 304 of the cable guide 300 is secured to a component within the second portion 104 of the housing, such as the AC entry module M. The cable C may then be inserted into the channel 316 of the cable guide 300, such as by feeding it through an end thereof and/or pushing the cable C past or around the resilient ribs 318, 320 of the cable guide 300. Given the ribs 318, 320 are relatively flexible, they may be flexed outwardly slightly when inserting the cable C within the channel 316. Once inserted, a first end portion 400 of the cable C may extend outwardly from the first end portion 302 of the cable guide 300 and a second end portion 402 of the cable C may extend outwardly from the second end portion 304 of the cable guide 300, as shown in FIG. 3. The cable guide 300 is deformed from the first orientation O1 to the second orientation O2 as the first and second portions 102, 104 of the housing are pivoted from an open position (shown in FIG. 11) to a closed position (shown in FIG. 12).

The lengths of the first and second end portions 400, 402 of cable C may be easily adjusted by either coiling or uncoiling a portion of the cable C from the guide assemblies 208a, 208b, 208c, 208d on the cable storage device 200. Thus, as portions of the cable C are coiled about the guide assemblies 208a, 208b, 208c, 208d, the length of uncoiled cable (e.g. first end portion 400 extending from the cable storage device 200 and/or second end portion 402 extending from the module M) is decreased. Conversely, as portions of the cable C are uncoiled from the guide assemblies 208a, 208b, 208c, 208d, the length of uncoiled cable C may be increased.

The cable storage device 200 and the cable guide 300 are particularly well suited for routing fiber optic cable, given fiber cable routed therethrough is protected and its minimum bend radius controlled. Moreover, excess lengths of the fiber cable may be easily and safely stored on the cable storage device 200, yet easily uncoiled therefrom if needed.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Further, it is to be understood that terms such as "left", "right", "front", "rear", "side", "end", "width", "inner", "outer" and the like as may be used herein, merely describe points or portions of reference and do not limit the present invention to any particular orientation or configuration. Further, terms such as "first", "second", "third", etc., merely identify one of a number of portions or components as disclosed herein, and do not limit the present invention to any particular configuration. Accordingly, it is appropriate that the appended claims be construed broadly and in a manner consistent with the scope of the apparatus, system, and method, as set forth in the following claims.

What is claimed is:

1. A system comprising:
   a housing having a first portion with an interiorly disposed surface and a second portion hingedly connected to said first portion, wherein said first portion and said second portion are configured to pivot about an axis of rotation;
   a cable storage device having a base portion and an upper end portion, wherein the cable storage device is configured to retain a cable and is connected to said interiorly disposed surface of said first portion such that said base portion of said cable storage device is secured to said interiorly disposed surface of said first portion and said upper end portion of said cable storage device extends in a direction substantially perpendicular to said interiorly disposed surface of said first portion; and
   a cable guide including a flexible strap having a first end portion connected to said cable storage device and an opposite second end portion coupled to said second portion of said housing, wherein said flexible strap is configured to restrain said cable guide from exceeding a predetermined maximum curvature, said cable guide including a first sidewall extending upwardly from a first side edge of said flexible strap and a second sidewall extending upwardly from an opposite second side edge of said flexible strap, said first sidewall and said second sidewall of said cable guide defining a channel configured to receive a cable.

2. The system of claim 1, wherein said cable storage device includes a plate and a plurality of guide walls extending outwardly from said plate and spaced about a central portion of said plate, said plurality of guide walls configured to retain a portion of the cable in a coil about said central portion.

3. The system of claim 1, wherein said cable guide is reconfigurable between a first orientation when said first and second portions of said housing are in an open position, and a second orientation when said first and second portions of said housing are in a closed position.

4. The system of claim 3, wherein said cable guide comprises a first substantially curved orientation with a first radius of curvature in said first substantially curved orientation, and a second substantially curved orientation with a second radius of curvature less than said first radius of curvature in said second substantially curved orientation.

5. The system of claim 3, wherein said cable guide has a W-shaped configuration in said second orientation.

6. The system of claim 1, wherein said first sidewall comprises a first plurality of ribs, and said second sidewall comprises a second plurality of ribs, said first plurality of ribs staggered from said second plurality of ribs.

7. The system of claim 6, wherein said first and second pluralities of ribs and said flexible strap are integrally formed.

8. The system of claim 6, wherein each rib of said first and second pluralities of ribs has an inverted L-shaped configuration.

9. The system of claim 1, wherein said cable guide extends outwardly from said cable storage device in a direction substantially transverse to said axis of rotation about which said first and second portions of said housing pivot.

10. The system of claim 1, wherein said cable guide includes at least one latch extending outwardly from said first end of said flexible strap, said latch secured within a corresponding opening in said base portion of said cable storage device.

11. The system of claim 9, wherein said cable guide includes a first plurality of latches extending outwardly from said first end of said flexible strap and secured within corresponding openings in said base portion, and a second plurality of latches extending outwardly from said second end of said flexible strap and secured within corresponding openings of said second portion of said housing.

12. The system of claim 1, wherein said first portion of said housing is pivotal relative to said second portion of said housing about an axis substantially transverse to a longitudinal axis of said channel.

13. An apparatus comprising:
   a housing having a first portion with a first interiorly disposed surface and a second portion hingedly connected to said first portion with a second interiorly disposed surface, wherein said first portion and said second portion are configured to pivot about an axis of rotation;
   a flexible strap having opposing first and second opposite ends and opposing first and second opposite sides;
   a first connection mechanism disposed on said first end of said flexible strap, said first connection mechanism configured to secure said first end to said first portion of said housing by mating with a corresponding opening in said first interiorly disposed surface of said first portion of said housing;
   a second connection mechanism disposed on said second end of said flexible strap, said second connection mechanism configured to secure said second end to said second portion of said housing by mating with a corresponding opening in said second interiorly disposed surface of said second portion of said housing;
   a first plurality of ribs extending upwardly from said first side of said flexible strap and integrally formed with said flexible strap; and
   a second plurality of ribs extending upwardly from said second side of said flexible strap and integrally formed with said first plurality of ribs and said flexible strap, said flexible strap and said first and second plurality of ribs defining a channel configured to releaseably retain a cable therethrough.

14. The apparatus of claim 13, wherein said first connection mechanism includes at least one latch extending outwardly from said first end of said flexible strap, said at least one latch securable within a corresponding opening in a component disposed within said first portion of said housing.

15. The apparatus of claim 13, further comprising a cable storage device having a base portion and an upper end portion, wherein the cable storage device is connected to said first interiorly disposed surface of said first portion such that said base portion of said cable storage device is secured to said first interiorly disposed surface of said first portion and said upper end portion of said cable storage device extends in a direction substantially perpendicular to said first interiorly disposed surface of said first portion, wherein said first end of said flexible strap is secured to said cable storage device via said first connection mechanism.

16. The apparatus of claim 15, wherein said cable storage device includes a plate and a plurality of guide walls extending outwardly from said plate, said plurality of guide walls spaced about a central portion of said plate and configured to retain a portion of the cable in a coil about said central portion.

17. The apparatus of claim 13, wherein said first plurality of ribs is staggered from said second plurality of ribs.

18. A method comprising:
securing a first end of a cable guide to a cable storage device, the cable guide defining a channel for receiving a cable;
securing the cable storage device to a first interiorly disposed surface of a first portion of a housing, the first portion hingedly connected to a second portion of the housing such that the cable storage device extends in a direction substantially perpendicular to the first interiorly disposed surface;
securing a second end of the cable guide to a second interiorly disposed surface of the second portion of the housing; and
inserting a cable into the channel so that a first end portion of the cable extends outwardly from the first end of the cable guide and a second end portion of the cable extends outwardly from the second end of the cable guide.

19. The method of claim 18, further comprising coiling a portion of the first end portion of the cable about guide walls provided on the cable storage device, thereby decreasing a length of uncoiled cable.

20. The method of claim 18, further comprising reconfiguring the cable guide from a first orientation to a second orientation by pivoting the first and second portions of the housing from an open position to a closed position.

* * * * *